US006459708B1

United States Patent
Cox et al.

(10) Patent No.: US 6,459,708 B1
(45) Date of Patent: Oct. 1, 2002

(54) APPARATUS AND METHOD FOR PROVIDING T1/E1 TELECOMMUNICATIONS TRUNKS OVER IP NETWORKS

(75) Inventors: James Cox, Cedar Park, TX (US); Jack Gerlach, Austin, TX (US); James Mott, Austin, TX (US); Robert Pearson, Round Rock, TX (US)

(73) Assignee: Toledo Communications, Inc., Austin, TX (US)

( * ) Notice: Subject to any disclaimer, the term of this patent is extended or adjusted under 35 U.S.C. 154(b) by 0 days.

(21) Appl. No.: 09/468,775

(22) Filed: Dec. 21, 1999

(51) Int. Cl.[7] ............................. H04J 3/02; H04L 12/66
(52) U.S. Cl. ...................... 370/537; 370/463; 370/465; 370/466
(58) Field of Search ................................. 370/352, 353, 370/389, 390, 392, 401, 412, 420, 422, 463, 465, 466, 467, 470, 471, 474, 537

(56) References Cited

U.S. PATENT DOCUMENTS

| | | | | |
|---|---|---|---|---|
| 4,740,955 A | * | 4/1988 | Litterer et al. | 370/264 |
| 5,426,637 A | * | 6/1995 | Derby et al. | 370/401 |
| 5,440,616 A | * | 8/1995 | Harrington et al. | 379/88 |
| 5,682,386 A | * | 10/1997 | Arimilli et al. | 370/468 |
| 5,892,764 A | * | 4/1999 | Riemann et al. | 370/401 |
| 5,910,946 A | * | 6/1999 | Csapo | 370/328 |
| 6,044,080 A | * | 3/2000 | Antonov | 370/401 |
| 6,064,653 A | * | 5/2000 | Farris | 370/237 |
| 6,069,890 A | * | 5/2000 | White et al. | 370/352 |
| 6,219,348 B1 | * | 4/2001 | Allen, Jr. et al. | 370/354 |
| 6,298,043 B1 | * | 10/2001 | Mauger et al. | 370/248 |

FOREIGN PATENT DOCUMENTS

| | | |
|---|---|---|
| EP | 1 026 848 A2 | 3/2000 |
| WO | PCT/US98/24290 | 5/1999 |

OTHER PUBLICATIONS

Ramnath A. Lakshmi–Ratan, XP–000851517, The Lucent Technologies Softswitch—Realizing The Promise Of Convergence, Apr. 2, 1999, p. 176, col. 2, line 10—p. 181, col. 2, line 16.

Raffaele Noro, XP–000991295, "Circuit Emulation Over IP Networks", Aug. 25, 1999, pp. 187–201.

Shaul Berger, XP–000992213, "Implement A Single–Chip, Multichannel VoIP DSP Engine", May 25, 2000, pp. 101–105.

* cited by examiner

Primary Examiner—Hassan Kizou
Assistant Examiner—Saba Tsegaye
(74) Attorney, Agent, or Firm—Richard K. Huffman; James W. Huffman

(57) ABSTRACT

An apparatus and method are provided that enable T1 (or E1) telecommunications frames to be transmitted between T1 (or E1) telecommunications switches over a high bandwidth packet-switched network. The apparatus includes trunk interface logic and network translation logic. The trunk interface logic is coupled a central office switch via a central office switch trunk, and receives the telecommunications frames from the central office switch. The network translation logic is coupled to the trunk interface logic. The network translation logic translates the telecommunications frames into network packets that the telecommunications frame data may be transferred over the high bandwidth packet-switched network.

40 Claims, 8 Drawing Sheets

Public Switched Telephone Network (PSTN) Interconnectivity

Method for Providing T1/E1 Trunks Over and IP Network

APPARATUS AND METHOD FOR PROVIDING T1/E1 TELECOMMUNICATIONS TRUNKS OVER IP NETWORKS

BACKGROUND OF THE INVENTION

1. Field of the Invention

This invention relates in general to the field of telecommunications, and more particularly to an apparatus and method for providing T1/T1 telecommunications links over a high bandwidth data network.

2. Description of the Related Art

Along with the widespread proliferation of the telephone in the early 1900's came the attendant development of the supporting infrastructure required to interconnect millions of these communication devices. A complex network of wires, cables, and switching equipment was developed to support the switching of calls from their source to their destination. To a significant degree, this infrastructure is still in place today.

The backbone of the public switched telephone network (PSTN) consists of a network of local exchanges, or local switches. A local switch is the point at which all of the telephones within a its local area connect into the PSTN. A switch is also referred to as a central office switch or a telecommunications switch. Each of the telephones in a local area are connected to a pair of telephone wires and all of the telephone wires in the local area originate at the central office switch. When a user picks up the receiver of his/her telephone, equipment within the local switch generates the dial tone that he/she hears in the receiver. When the user dials a destination number, the equipment in the local exchange decodes the number and routes the call to its destination. If the destination telephone is also connected to the local switch, or central office switch, then the equipment connects the calling telephone pair to the destination telephone pair for the duration of the call. During the conversation, voice signals are transmitted as over the connected pairs of wires. When the user hangs up the telephone receiver, then the switching equipment terminates the connection between the two pair of wires.

The above scenario applies, however, only to the interconnection of telephones within a local exchange. There are, in fact, hundreds of thousands of local exchanges all over the world. And to support the switching of calls from telephones in a source exchange to a destination exchange, there also exists a network of cables and supporting equipment. A cable or other medium that interconnects telephone exchanges, or telecommunications switches, is referred to as a trunk. A trunk typically is specified to support an average number of calls between its source telecommunications switch and destination telecommunications switch. Hence, when a call is placed from a source telephone interfaced to the source switch to a destination telephone interfaced to the destination switch, the switching equipment in both the source exchange and the destination exchange interact to effect the call. The source telecommunications switch decodes the called number and switches, or routes, the call over one of the trunks connected to the destination exchange. The destination telecommunications switch receives the call over the trunk from the source exchange, and further decodes the called number so that the call is routed to the destination telephone. In any metropolitan area today, there is network of local telephone exchanges along with their associated inter-exchange trunks to handle the switching of calls made within that area.

Similarly, these larger, metropolitan networks of exchanges are interconnected together in the same manner: A series of trunks interconnect all of the metropolitan areas within the United States and likewise, trunks interconnect most of the countries of the world. A trunk is the primary interconnection media for the PSTN.

In earlier years, as noted above, trunks essentially consisted of some number of wires between two central office switches. But in addition to the wires, trunks also consisted of a number of in-line signal amplifiers to prevent degradation of the analog voice signals that were routed over the interconnecting trunks.

In the 1960's, a major development within the telecommunications industry enabled service providers to improve the quality of trunk interconnections, while at the same time drastically reducing the number of wires which were theretofore required to provide trunk interconnections between central office switches. This development, the T1 carrier protocol, prescribes a series of time-division multiplexed formats for the transmission of digitized telephone conversation data, each of which allow up to 24 separate conversations to be carried between switches on the same pair of telephone wires. A basic T1 signal is a pulse coded modulation carrying 24 8-bit data elements, each of the 8-bit data elements containing a digitized and encoded sample of one of the 24 conversations. Samples are taken from each of the 24 conversations, or channels, at a rate of 8,000 samples per second and these samples are continuously transmitted at a 1.544 Mbps carrier frequency over a single pair of wires. A 125-microsecond portion of the transmission that contains encoded samples from channels 1 through 24 is known as a T1 frame. In actual practice, out-of-band signaling bits and other information are also contained in a T1 frame, however, the basic structure of a T1 frame is as described above.

The T1 carrier protocol is the basis protocol that is used to transmit trunk data within the United States. Today, it is more common to find high speed inter-exchange trunk links such as T3 links or OC-48 links. These links are, however, aggregates of T1 links that are generated by combining T1 link signals through devices commonly referred to as add drop multiplexers (ADMs). In Europe, the basis protocol used for trunks is E1. The E1 protocol varies from the U.S. standard in terms of the encoding of the signals, in terms of the number of channels that are sampled and transmitted at the 8,000 sample/second rate, and in the absence of signaling bit information. In E1, there are 32 channels per frame rather than 24. To achieve the 8,000 sample/second rate, the E1 carrier is transmitted at 2.048 Mbps. In Europe, ADMs are also used to aggregate E1 links into higher speed trunks such as E3 trunks.

The benefits provided by the T1(E1) protocol caused a significant expansion in the services provided over the. PSTN. As a result, telephone service providers have invested substantially in switching equipment that provides trunk signals compatible with the T1(E1) protocol. It is virtually impossible today to find a telecommunications switch which does not employ some form of the T1 protocol for the provision of inter-switch trunks. And service providers have continued to increase their investment in T1 switching technologies for nearly forty years. As alluded to above, a typical present day trunk consists of a number of aggregated T1 links, the most common form adhering to OC-48 protocol. OC-48 prescribes a 2.5 Gbps transmission rate.

Two developments during the 1980's, however, began to push the telecommunications industry to provide expanded and more varied services, i.e., services other than the transmission of voice signals. Advances in microcircuit design and fabrication techniques have enabled a significant percentage of the civilized world to have a computer in the home or office. In conjunction, advances in computer networking techniques and protocols have enabled all of those computers to communicate over the Internet. The Internet is a global network of interconnected computers that utilize a packet-switched communications protocol known as Internet Protocol (IP). And since the cables and trunks within the PSTN already provided the initial skeletal structure for integrating local, metropolitan, and global networks of computers, telephone service providers began to provide, and continue to provide, routing and distribution services for computer data that is transmitted via the Internet.

Five years ago, approximately 95 percent of the traffic passed over the PSTN was voice traffic. Today, voice traffic accounts for only 50 percent; computer data accounts for the remaining 50 percent of the traffic. And projections indicate that within another five years, computer data will account for over 90 percent of the traffic that is transmitted. Telephone service providers are now just beginning to significantly invest in packet-switched equipment for routing of computer data, or IP data.

The definite trend, both in terms of use and advances, is away from conventional synchronous networks based upon the T1(E1) protocol, and towards very high speed packet-switched networks. Consequently, present day telephone service providers are beginning to provide packet-switched network routers for the routing of computer data in collocation with their central office switching equipment. In such an arrangement, the central office T1(E1) switching equipment provides for the transmission of telecommunications signals over the T1-based network and the packet-switched equipment is used to route computer data over high bandwidth data networks. And while a number of developments have allowed packet-switched data to be transmitted over T1 trunks in the form of T1 frames, there is no extant system that allows T1 protocol frames to be transmitted over a packet-switched IP network. Granted, techniques and equipment exist for the transmission of voice-type signals over packet-switched networks, but these techniques require the complete replacement of T1 equipment within a PSTN switch with voice-over-IP (VOIP) equipment. Because of their substantial investment in T1(E1) switching equipment, telephone service providers are reluctant to make the change to VOIP.

Yet service providers are still pressed to increase telecommunications capacity through the addition of trunks between their telecommunications exchanges. But because they are quite reluctant to abandon their substantial investment in existing T1(E1) switching equipment, they consistently choose to add trunks that employ T1(E1)-based network equipment. The choice to utilize T1(E1) equipment is relatively expensive when compared to utilizing packet-switched network equipment. And in addition, the choice is short-sighted due to the fact that the industry is moving toward the increased use of packet-switched networks.

Therefore, what is needed is an apparatus that allows service providers to add T1(E1) trunks between central office switches that takes advantage of high speed packet-switched data networks.

In addition what is needed is a T1(E1)-to-IP multiplexing system that interfaces to T1(E1) telecommunications switching equipment but effects a T1(E1) carrier link over a high bandwidth data network.

Furthermore, what is needed is a method for sending T1(E1) signals between T1(E1) switches that utilizes a packet-switched network to deliver T1 frames to their intended destination.

SUMMARY

To address the above-detailed deficiencies, it is an object of the present invention to provide an apparatus for implementing a T1(E1) trunk between two central office switches that utilizes a packet-switched data network as the transmission medium.

Accordingly, in the attainment of the aforementioned object, it is a feature of the present invention to provide a multiplexer, for transmitting/receiving central office switch communications from/to a first central office switch to/from a second central office switch, the multiplexer utilizing a high bandwidth data network for communicating. The multiplexer includes trunk interface logic and network translation logic. The trunk interface logic is coupled to the first central office switch via a central office switch trunk, and receives/transmits the central office switch communications from/to the first central office switch. The network translation logic is coupled to the trunk interface logic. The network translation logic translates the central office switch communications to/from data network communications, so that the central office switch communications may be transferred over the high bandwidth data network to/from the second central office switch, thereby providing all channels of the central office switch trunk between the first and second central office switches.

An advantage of the present invention is that telephone service providers can utilize packet-switched technology to implement a T1(E1) trunk without having to change out their existing T1(E1) central office switches.

Another object of the present invention is to provide T1(E1)-to-IP multiplexer that interfaces to a TI(E1) central office switch but implements a T1(E1) carrier link over a high bandwidth data network.

In another aspect, it is a feature of the present invention to provide an apparatus for transmitting telecommunications frames between telecommunications switches via a high bandwidth data network. The apparatus has a plurality of telecommunications interface ports, network translation logic, and a network interface port. The plurality of telecommunications interface ports are each configured to transmit and receive frames associated with a corresponding telecommunications trunk, where the corresponding telecommunications trunk interconnect two of the telecommunications switches. The network translation logic is coupled to the plurality of telecommunications interface ports. The network translation logic translates outgoing frames into outgoing data packets for transmission over the high bandwidth data network, and translates incoming data packets into incoming frames for distribution to the plurality of telecommunications interface ports. The network interface port is coupled to the network translation logic. The network interface port provides full-duplex routing of the outgoing data packets and the incoming data packets over the high bandwidth data network, where the full-duplex routing enables all channels of the corresponding telecommunications trunk to interoperate between the telecommunications switches.

In a further aspect, it is a feature of the present invention to provide a telecommunications carrier multiplexer, for providing trunk signals between telecommunications switches, where the trunk signals are transmitted over a packet-switched data network. The telecommunications carrier multiplexer includes trunk interface logic, network translation logic, and network interface logic. The trunk interface logic transmits and receives trunk frames corresponding to a particular telecommunications trunk, where the particular trunk interconnects a first telecommunications switch and a second telecommunications switch. The network translation logic is coupled to the trunk interface logic and translates the trunk frames associated with the first and second telecommunications switches into network packets for transmission over the high bandwidth data network. The network translation logic has application envelope logic that appends a corresponding application header to each of the trunk frames to form a plurality of application packets, where the corresponding application header provides control data that enables transmission of a corresponding trunk frame. The network interface logic is coupled to the network translation logic and provides full-duplex routing of the network packets over the data network. Each of the network packets has an application packet set, comprising those of the application packets that are generated during a 250-microsecond interval. Each of the network packets also has an IP header, appended to the application packet set to form an IP datagram, that provides IP network routing information for the application packet set.

In yet another aspect, it is a feature of the present invention to provide a telecommunications switch interconnection apparatus. The telecommunications switch interconnection apparatus includes a trunk frame multiplexer and a data network router. The trunk frame multiplexer receives trunk frames from a source central office switch, and translates the trunk frames into network packets. The data network router is coupled to the trunk frame multiplexer. The data network router transmits the network packets over a high speed data network, where the network packets are transmitted in such a manner as to effect transmission of the trunk frames from the source central office switch to a destination central office switch.

Another advantage of the present invention is that telephone service providers can employ unused bandwidth on their packet-switched networks to carry T1 (E1) trunk data. Yet a further object of the present invention is to provide a method for sending T1(E1) signals between T1(E1) switches that utilizes a packet-switched network to deliver T1 frames to their intended destination.

In yet a further aspect, it is a feature of the present invention to provide a method for interconnecting central office switches via a high bandwidth data network. The method includes receiving telecommunications frames from a source central office switch for delivery to a destination central office switch, translating the telecommunications frames into a plurality of network data packets and transmitting the plurality of network data packets over the high bandwidth data network, and converting the plurality of network data packets back into the telecommunications frames and providing the telecommunication frames to the destination central office switch.

Yet a further advantage of the present invention is that multiple T1(E1) trunks can be added between a number of central office switches over the same packet-switched network medium.

BRIEF DESCRIPTION OF THE DRAWINGS

These and other objects, features, and advantages of the present invention will become better understood with regard to the following description, and accompanying drawings where.

DETAILED DESCRIPTION

In view of the above background on techniques for transmitting T1/E1 telecommunications signals between central office switches, several related art examples will now be discussed with reference to FIGS. 1 through 3. These examples illustrate the problems associated with increasing the number of telecommunications trunks between telecommunications switches. More specifically, present day telephone service providers maintain T1/E1 equipment to provide for the transmission of telecommunications signals between T1/E1 switches, and they are beginning to provide packet-switched network equipment for the transmission of data signals between computer devices connected to a high bandwidth packet-switched network. In spite of the trend toward the eventual elimination of T1/E1 networks altogether, telephone service providers must continue to use the more expensive T1/E1 equipment to provide trunks between switches, primarily because their investment in T1/E1 equipment within the switches is substantial; the incremental cost of providing additional T1/E1 trunk devices is less than that which would otherwise be required to completely change over a switch from T1/E1 technology switching equipment to packet-switched technology switching equipment. Following this discussion, a detailed description of the present invention will be provided with reference to FIGS. 4 through 9. The present invention solves the above-noted problems in that it provides an apparatus and method that allows telephone service providers to add T1/E1 telecommunications trunks between switches without having to utilize a T1/E1 technology network. Instead, a packet switched network is used to carry the T1/E1 signals between switches. The T1/E1 signals are translated into network data packets and these network packets are then transmitted over the service provider's existing high speed packet-switched data network.

Figure 1:
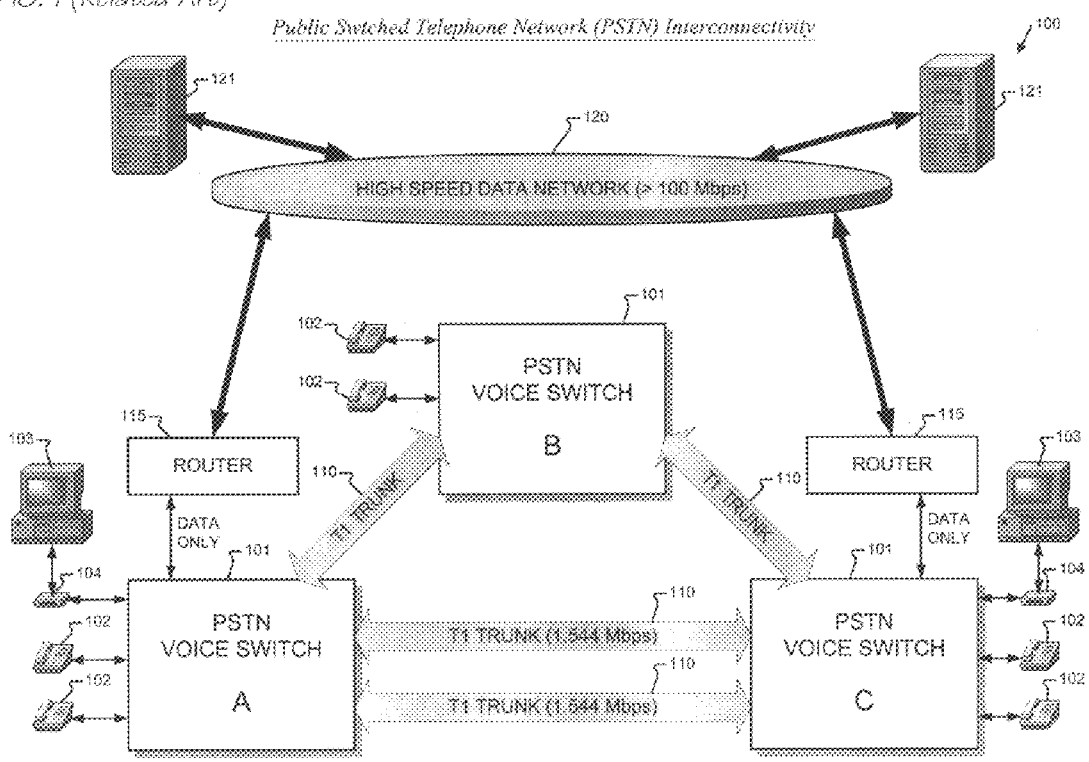
FIG. 1 is a diagram illustrating how present day central office switches employ T1 trunks for the transmission of telecommunications signals, and high speed data networks for the transmission of data signals.

Now referring to FIG. 1, a diagram 100 is presented illustrating how present day voices switches employ T1/E1 trunks for the transmission of telecommunications signals and how in conjunction they employ high speed data networks for the transmission of data. The diagram 100 depicts three central office switches 101 at locations A, B, and C. Telephones 102 and modems 104 are connected to central office switches 101 A and B. Telephones 102 are connected to central office switch B 101. The central office switches 101 are interconnected by T1 trunks 110, or higher speed trunks 110 based upon the T1 protocol. The diagram 100 also shows that two of the three central office switches 101 are each connected to a router 115. Each of the routers 115 is connected to a high speed data network 120. In addition, the diagram 100 shows two other data network devices 121 connected to the high speed data network 120. These two data network devices 121 could be embodied as routers 121 for network traffic or they 121 could be data servers 121 with embedded routing equipment which are directly accessed over the network 120.

Operationally, telephones 102, modems 104, and other telecommunications devices (not shown) such as facsimile machines typically transmit and receive analog voice signals when communicating with a corresponding central office switch 101. Generally, these central office switches 101 are geographically located within a few miles of the telephonic devices 102, 104 because analog signals degrade over even short distances. The central office switch 101 is the primary point at which analog telecommunications devices 102, 104 interface to the public switched telephone network (PSTN). One skilled in the art will appreciate that though there are devices such as ISDN modems (not shown) and DSL modems (not shown) that provide a digital interface to the PSTN, the vast majority of telephonic devices 102, 104 interface to the PSTN using analog signals. In addition, although for clarity purposes FIG. 1 only depicts two telephones 102 connected to each of the PSTN switches 101, one skilled in the art will appreciate that PSTN switches 101 have the capacity to interface to thousands of telecommunications devices 102, 104.

When a call is placed from a telephone 102 at point A to a telephone 102 at point B, the central office switch 101 at point A routes the telecommunications signals provided by the telephone 101 at point A to the central office switch 101 at point B by partially decoding the destination telephone number provided by the telephone 102 at point A. Central office switch B 101 further decodes the destination telephone number to establish a full-duplex connection between the two telephones 102. More specifically, a full-duplex connection is a connection in which telecommunications signals can be simultaneously transmitted and received between the two telephones 102.

In earlier years, point-to-point wiring was used to interconnect central office switches 101. Hence, for each call between switch A 101 and switch B 101, corresponding dedicated wires were required. In addition to dedicated wiring, because of the distances involved between switches 101, analog amplification equipment (e.g., repeaters) were also required to prevent degradation of the analog signals as they traveled from switch 101 to switch 101.

In the early 1960s, however, the T-carrier digital system was introduced to effect better and more efficient interconnections between central office switches 101 through the utilization of digital technologies. The T-carrier T1 trunks 110 shown in FIG. 1 provide for time-division multiplexing of digitized telecommunications signals between central office switches 101 at a rate of 1.544 Mbps. A single T1 trunk 110 can simultaneously transmit 24 separate telephone connections (i.e., voice calls, fax transmissions, modem signals, etc.) Now, rather than necessitating dedicated wires and repeaters for each inter-switch connection, T1 trunks 110 enable telephone companies (telcos) to multiplex telecommunications signals over two pairs of wires: one pair for sending and one pair for receiving, thus providing full-duplex capability. T1 trunks 110 have been the standard means for interconnecting PSTN switches 101 for over 30 years. As a result, the telcos have invested substantially in T1 switching equipment 101 and other equipment such as add drop multiplexers (ADMs) (not shown) in order to support the ever increasing demand for telecommunications services. FIG. 1 shows only one trunk 110 between switch A 101 and switch B 101, thus providing the capability to support 24 simultaneous connections. Two trunks 110 interconnect switches A 101 and C 101, thus supporting 48 simultaneous connections. For clarity of description, only a small number of trunks 110 are shown interconnecting the switches 101 in FIG. 1, however, one skilled in the art will appreciate that hundreds of T1 trunks 110 are typically found within present day PSTN switches 101. In fact, high speed trunks using T3 or OC-48 protocol are typically provided between switches 101. These high speed trunks consist of numerous aggregated T1 trunks 110, or T1 links 110, which are generated by ADMs. Furthermore, one skilled will also acknowledge that variants of the T1 carrier system are used throughout the world, the E1 carrier system being the most prevalently used technique in Europe. The E1 carrier system uses a protocol similar to T1, but multiplexes 32 channels at a rate of 2.048 Mbps.

For many years, the T1/E1-carrier system has provided an efficient and cost-effective means for interconnecting central office switches 101, primarily because the data throughput requirements for voice transmission are much lower than that provided by the 24 channels within a T1 trunk 110. But the advent of digital computing technologies and internetworking of computers 103, and the proliferation of computing devices in the marketplace, has caused an exponential increase in the demands placed on telecommunication companies for increased channel capacity.

Computers 103, 121 are inherently digital devices that operate exclusively on digital data. However, for the computer 103 at point A to communicate with the computer 103 at point C, the digital data signals must first be converted into analog signals so that they are compatible the central office switches 101. The modems 104 convert the data signals to analog telecommunication signals upon transmission and perform the opposite conversion upon reception. Today, dial-up modems 104 dominate the marketplace as the primary means for connecting a single computer 103 to a network of other computers 121.

The growth of packet-switched networking technologies and techniques in the early 1980s, in particular the development and proliferation of the Internet Protocol (IP) for interconnection of large numbers of computers 103, 121, has enabled millions of computers 121 to communicate in near real time over a series of interconnected high speed data networks 120, one of which is shown in FIG. 1. These interconnected packet-switched networks are commonly referred to as the Internet.

Packet-switched networks 120 utilize a layered protocol architecture that allows two devices to communicate at a higher level using one communications protocol without either of the devices having any specific knowledge of the communications protocol that is used at lower levels. As a result, there are several protocols used at the lowest level, or physical level, that are used for the transmission of data over a packet-switched networks 120. These physical protocols include Ethernet, asynchronous transfer mode (ATM), HDLC, ISDN, and X.25. As a result, a given computer 103, 121 utilizing IP at a higher level can communicate with another computer using IP, regardless of whether the physical layer protocol is Ethernet or another physical protocol. This is advantageous to service providers because the layered architecture allows them to upgrade their physical transmission medium without affecting higher level communications. An in-depth discussion of the Internet Protocol and related physical transmission protocols for layered packet-switched networks 120 is beyond the scope of this application. It is sufficient to note, however, that IP packet-switched networks 120 are now the predominant means used to interconnect large numbers of computers 103, 121.

As a result, as well as providing switching capabilities for telecommunications signals, telephone service providers are beginning to provide gateways 115 to high bandwidth packet-switched data networks 120 in order to more efficiently route computer data, or IP data. It is not uncommon today to find both T1-based equipment such as an ADM and packet-switched networking equipment 115 such as a router 115 collocated within the same facility that provides a PSTN switch 101. FIG. 1 shows two of the three central office switches 101 having connection points, or gateways 115, to the packet-switched data network 120. Telecommunications signals are still routed between switches 101 using traditional T1-based trunks 110, but data signals between computers 103 are now beginning to be routed directly to the data network 120 for transmission. However, as the number of computers 103 and communication devices 102 continue to increase, telecommunications companies are being forced increase their capacity to transmit both telecommunications signals and data.

Figure 2:
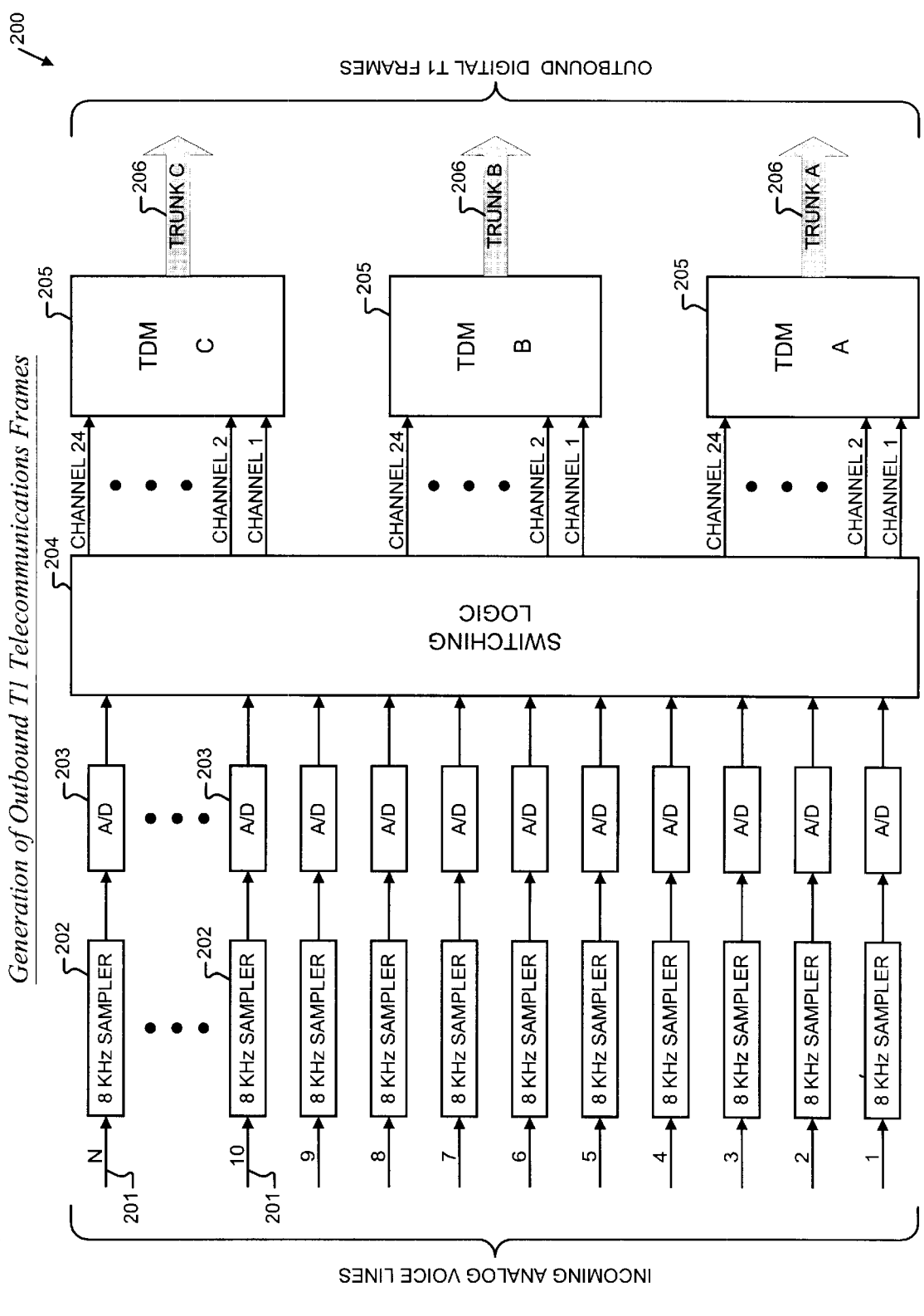
FIG. 2 is a block diagram illustrating how elements within a present day central office switch are used to convert analog telecommunications signals to digital T1 carrier frames.

Now referring to FIG. 2, a block diagram is presented illustrating elements within a present day central office switch 200 that are employed to convert analog telecommunications signals to digital T1 carrier signals, or T1 frames. The block diagram shows N incoming analog telecommunication lines 201. Each of the lines 201 are connected to an 8 kHz sampler 202. The output of each sampler 202 is provided to an analog-to-digital converter (A/D) 203. All of the A/D's 203 are connected to switching logic 204. The switching logic 204 provides its outputs to a number of time-division multiplexers (TDMs) 205, each multiplexer 205 generating a T1 carrier signal for a corresponding T1 trunk 206. A 125-microsecond segment of a T1 carrier signal that contains all 24 channels is called a T1 frame. The digital data for each of the 24 channels is provided from the switching logic 204 to each TDM 205. For an E1 carrier system, 32 channels would be provided to each TDM 205. Hereinafter, the discussion focuses on the generation of T1 frames, however, one skilled in the art will appreciate that the elements of FIG. 2 can equally apply to the generation of E1 frames, the difference lying in the number of channels provided to each TDM 205 (32 versus 24), signaling bit differences, and the speed at which the TDMs 205 operate (2.048 Mbps versus 1.544 Mbps) For clarity of presentation, only three T1 trunks 206 are depicted in FIG. 2.

In operation, each incoming analog line 201 is sampled at 125-microsecond intervals by the 8 kHz samplers 202. These samples, either of a voice signal, a facsimile signal, or even a modem signal, are converted by the A/Ds 203 into 8-bit digital data entities, or bytes. The switching logic 204 decodes the destination telephone number provided over the line 201 to determine which TDM 205 (and corresponding trunk 206) is to be used for transmission of a particular 8 kHz stream, or channel. Channel assignment for the particular 8 kHz stream within a TDM 205 is merely a function of channel, or slot, availability within the TDM 205. The TDMs 205 continuously generate their corresponding T1 frames at an 8 kHz frame rate and the T1 frames are routed over corresponding trunks 206 to a destination switch. At the destination switch, the T1 carrier signals are demultiplexed and each 8 kHz stream within a carrier signal is converted back into an analog signal and routed to its destination telecommunications device.

One skilled in the art will appreciate that the illustration provided with reference to FIG. 2 represents what occurs within a telecommunications switch 200 at a high level. For instance, within a present day telecommunications switch, not all of the incoming lines 201 are analog. Service providers today provide the ability to switch digital incoming signals such as ISDN and DSL, as well as analog signals. Furthermore, whereas in the case of E1 carriers the outputs of the A/D's 203 are true 8-bit voice samples, one skilled with appreciate that the outputs of the A/D's 203 in the case of T1 are encoded as well. For T1, signaling bits are also added to a bit stream. One skilled will moreover appreciate that a present day telecommunications switch 200 does not provide single T1 signals for inter-switch links 206. Rather, numerous T1 signals are aggregated ADM's (not shown) to output trunk signals 206 such as T3 and OC-48. The purpose of FIG. 2 is to portray the continuous nature of present day central office switches 200. To preserve quality of service, incoming signals 201 must be continuously sampled, encoded, and transmitted. The function of the switching logic 204 is merely to continuously route digitized and encoded data to a proper "time slot" within a T1 frame. Hence, to preserve the quality of a conversation, the transmission of digitized voice within a T1 frame must occur at a frequency at which a user on the receiving end cannot distinguish delivery means. One skilled will concur that the T1 (and E1) 8 kHz frame transmission rate allows for excellent quality in the presence of nominal error conditions, i.e., conditions in which some time slots within a particular T1 (or E1) frame are missed. Transmission timing, to the extent that samples must be continuously transmitted during a conversation, is essential to the quality of service that is provided. Yet, because the T1 carrier system was specifically developed to support the transmission of voice signals, the timing attributes needed to provide good quality voice service are inherent features of a T1 (or E1) signal: it is a continuous signal. But transmissions on a packet-switched network are not continuous. The distinctions between a continuous E1 signal and a packet-switched transmission are more specifically described with reference to FIG. 3.

Figure 3:
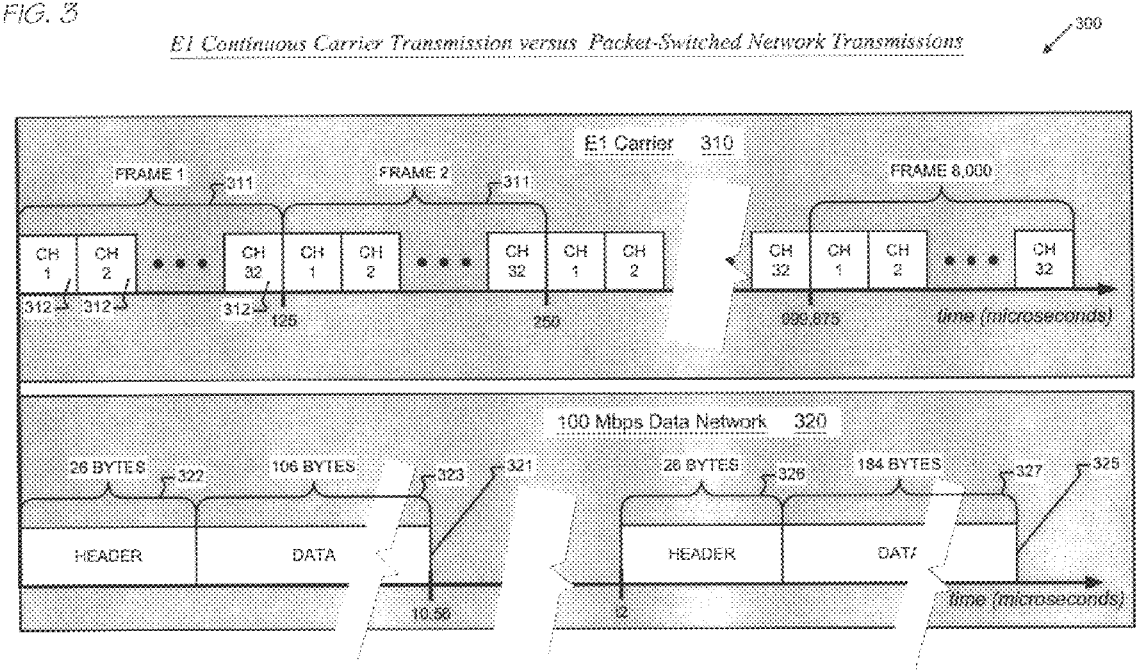
FIG. 3 is a timing diagram depicting E1 frames being continuously transmitted over an E1 trunk as compared to packet-switched data being transmitted over both a 100 Mbps packet-switched data network.

Now referring to FIG. 3, a timing diagram 300 is presented depicting the composition of an E1 carrier signal 310 when transmitted over an E1 trunk as contrasted with commensurate data when transmitted over a 100 Mbps packet-switched network 320. The timing diagram 300 shows a 1-second sequence of E1 frames 311 within the E1 carrier signal 310. Each of the E1 frames 311 consist of 32 time-division multiplexed channels 312 of digitized telecommunications information. The timing diagram 300 also depicts a first data packet 321 and a second data packet 325, both of which are transmitted over a 100 Mbps packet-switched network 320. The two packets 321, 325 are shown in the diagram 300 to illustrate that packet-switched transmissions over a data network 320 are not continuous transmissions. Rather, the transmissions are packetized, i.e., information is transmitted in bursts as transmissions are required rather than continuously as is the case with E1 networks 310. In addition, the length of packet transmissions 321, 325 need not be the equal. For reference, a packet-switched network 320 is often referred to as a data network 320 or an IP network 320. Networks 320 operating at speeds of at least 100 Mbps are referred to as high bandwidth networks 320, broadband networks 320, or high speed networks 320.

As alluded to with reference to FIG. 2, the E1 carrier signal 310 is a continuous transmission of 125-microsecond E1 frames 311 each consisting of 32 channels 312. Each of the 32 channels 312 contains an 8-bit data sample of a digitized telecommunications signal, thus resulting in a total of 256 bits of channel information per frame 311. Thus, the 2.048 Mbps carrier frequency is achieved by transmitting all 32 channels 312 within a 125-microsecond interval.

In contrast to the E1 carrier 310, packet switched communications 321, 325 are not continuous; they are typically transmitted as required. Typical data packets 321, 325, or datagrams 321, 325 consist of a header field 322, 326 and a data field 323, 327. When a first device connected to the network 320 desires to communicate with a second device that is connected to the network 320, the first device typically provides it's data to a transmission port. This port may be embodied either physically or virtually (i.e., provided as a semaphore within a software algorithm). Within an IP network 320, a transmission port appends an IP header to the data that identifies a corresponding destination port on the second device through which data communications will occur. IP layer apparatus appends the IP header the data to form an IP packet 323, 327 or IP datagram 323, 327. It is the IP packet 323, 327 that comprises the data field 323, 327 shown in FIG. 3. The IP header provides information to a corresponding layer in the second device that will ensure transmission and delivery of the data. The data field 323 within packet 321 has been configured to represent the number of bytes (i.e., 106 bytes) required to transmit data commensurate with 2 sequential E1 frames 311: 64 application data bytes representing two sequential sets of the 32 channels 312, along with 42 bytes of IP header data and other control information. Thus, the data field 323 shown in packet 321 represents that data required to transmit two frames of 32-channel E1 information within a single network data packet 321.

In addition to header information that is embedded within the data fields 323, 327, physical network layer processes append physical network headers 322, 326 to the IP packets 323, 327. The physical network headers 322, 326 provide control information for physical layer hardware to include a destination address of a physical device on the network 320 to which the network packets 321, 325 will be delivered, a source address of the transmitting device on the network 320, and a packet length identifying the size of the packet 321, 325.

In the layered protocol scheme briefly discussed above, successive levels of processing are employed to allow the transmission of packets 321, 325 between computers over a number of various network topologies and physical protocols. For example, routing of a packet from a device using Ethernet protocol to a device connected that uses a different protocol involves only substitution of the physical header 322 information. It is beyond the scope of this application to provide and in-depth discussion of packet-switched network topologies and protocols. What is sufficient to note herein is that devices on a packet-switched network employ a layered set of protocols to ensure transmission of data. The network medium can be any physical medium that can interface to the IP level to include wire, coaxial cable, fiber-optic cable, microwave, or satellite links.

It takes 250 microseconds to transmit a two complete E1 frames 311 over an E1 network 310. It takes only a fraction of that time, 10.56 microseconds, to transmit equivalent information over a 100 Mbps packet switched data network 320. One may perhaps conclude that the bit rate of the 100 Mbps network 320 is roughly 50 times that of the E1 network 310 yet this is not the point. The point of the diagram 300 is that, in spite of the marked differences between the E1 (or T1) protocol and protocols governing IP-based transmissions, the bandwidth of a high speed packet-switched network 320 is more than adequate to support timely transmission of E1 (or T1) frame data between two central office switches.

In addition to the above observation, there are two more subtle characteristics of present day telecommunications switches that the present inventors have observed and wish to convey.

First, the trend in the communications industry is moving away from synchronous network technologies and towards packet-switched technologies. In fact, significant milestones have already been achieved in the area of transmitting real-time voice or other telecommunications signals over IP networks. Packet-switched central office switches now exist for providing voice over IP (VOIP) networks. But, as noted above, to do so requires that a telephone service provider completely change over equipment within a central office switch from that which uses the T1 (or E1) protocol to VoIP-based equipment.

Finally, the T1/E1 carrier system is maintained as a standard for switching equipment within the telecommunications industry because service providers have already invested substantially in T1/E1 switching equipment. A radical changeover from T1/E1 central office switches to packet-switched central office switches would not make good financial sense. Yet today there is no cost-effective way to incrementally affect this change without forfeiting a significant investment in T1/E1 equipment.

To summarize the examples presented with reference to FIGS. 1 through 3, present day telephone service providers all over the world face a significant challenge when it comes to increasing their inter-switch trunk capacity. Do they accept the short-term cost of adding T1 technology network trunks 310 and increasing their investment in a technology that will eventually no longer be used, or do they face the formidable cost of completely converting their existing T1/E1 switching equipment over to packet-switched technology switching equipment? Generally, the least expensive short-term approach is selected, in spite of the fact that virtually every major present day service provider will, within a few years, also maintain a gateway to a packet-switched data network 320 in proximity to their existing T1/E1 switching equipment.

The present invention overcomes the problems cited above by providing a cost-effective apparatus and method for incrementally upgrading the capabilities of present day T1/E1 central office switches. The present invention allows telephone service providers to reap benefits of packet-switched technologies without the attendant cost of completely converting over to packet-switched equipment. Through use of the present invention, virtual T1/E1 trunks can be added between T1/E1-technology central office switches over a high bandwidth packet-switched network; T1/E1 carrier networks are no longer required. The present invention is more specifically described with reference to FIGS. 4 through 9.

Figure 4:
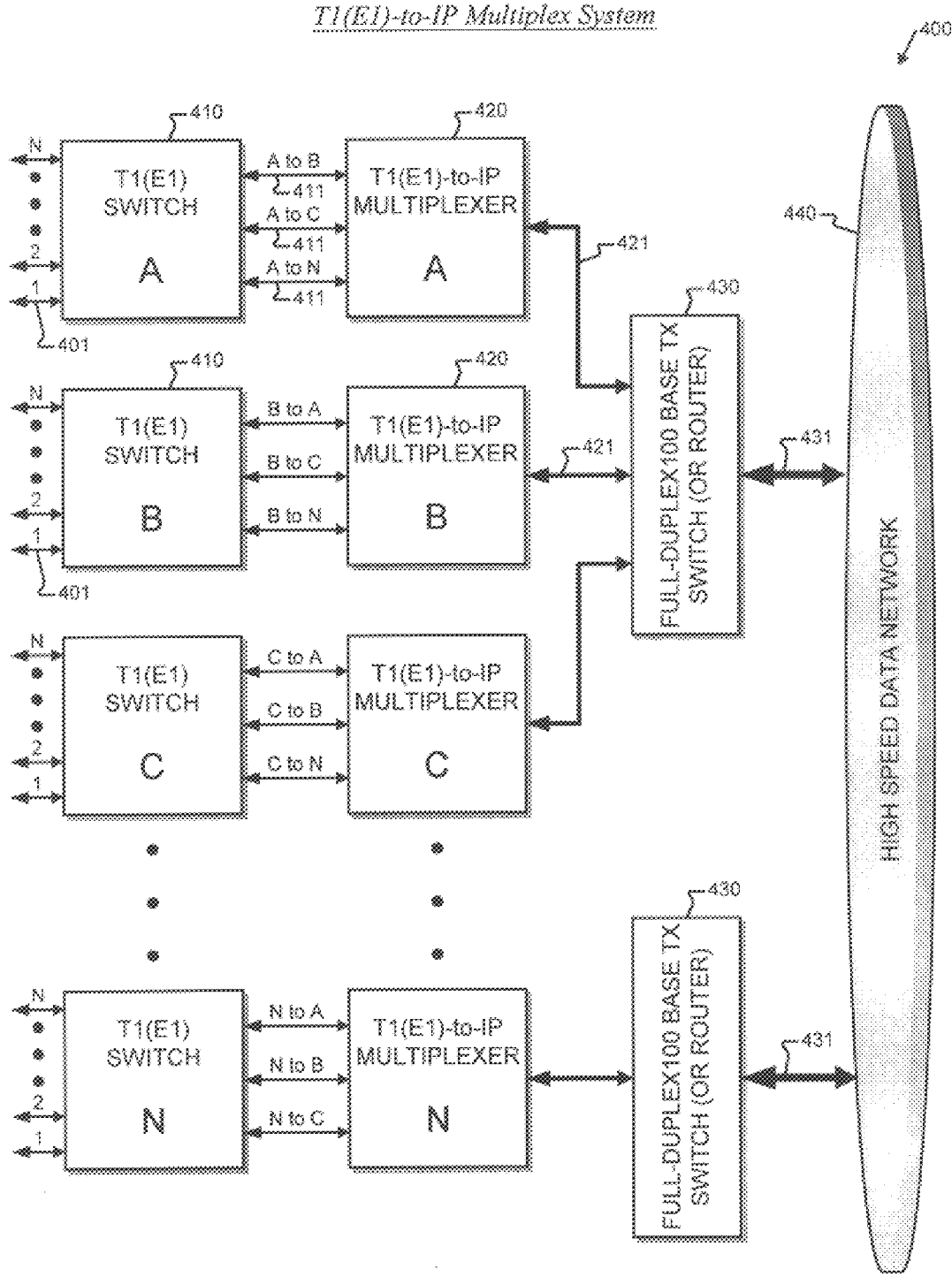
FIG. 4 is a block diagram of a system according to the present invention for providing T1 trunk interconnections between T1 telecommunications switches via a high bandwidth data network.
Figure 5:
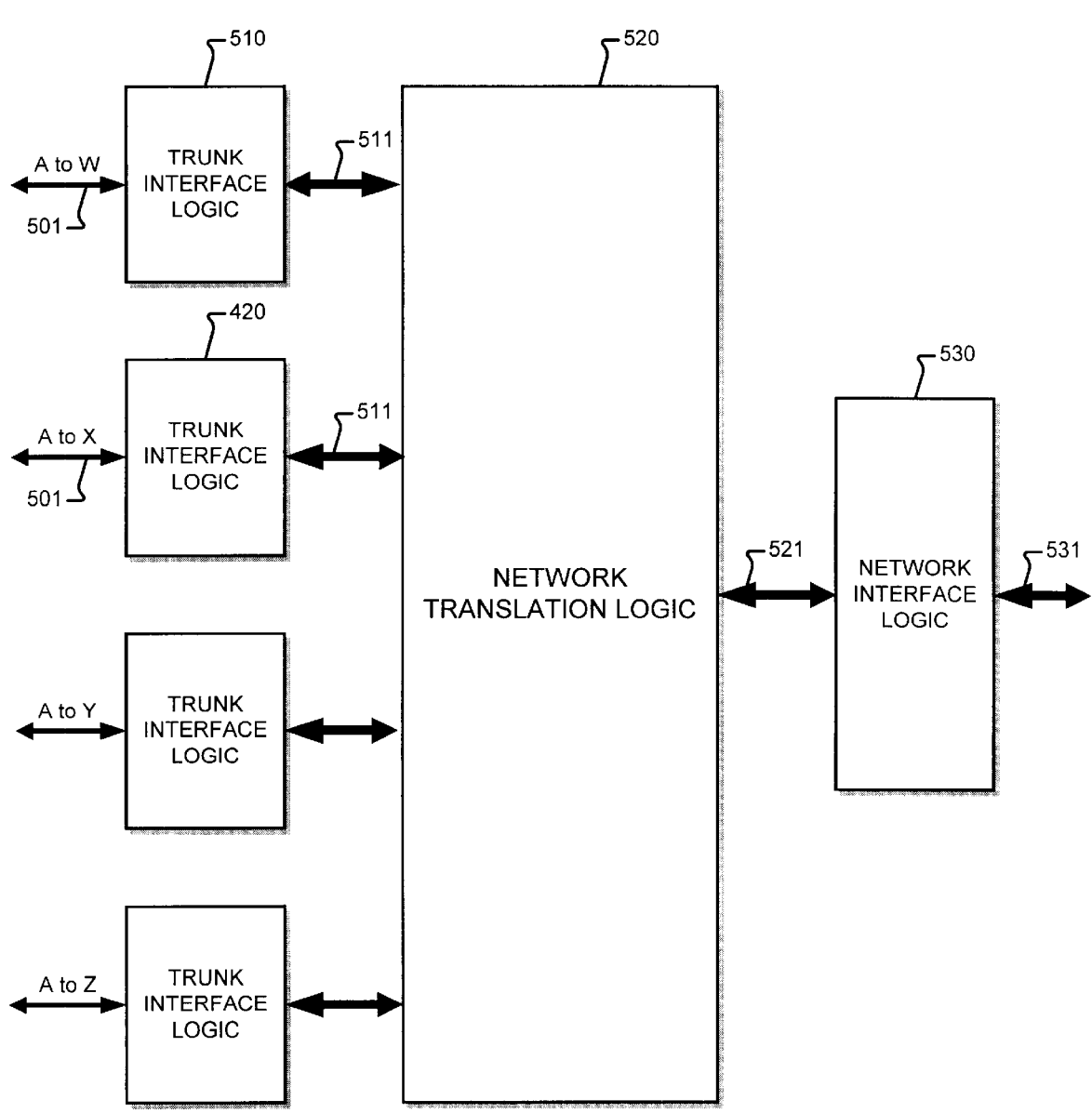
FIG. 5 is a block diagram illustrating a T1(E1)-to-IP multiplexing apparatus according to the present invention.

Referring to FIG. 4, a block diagram is presented of a system 400 according to the present invention for providing T1/E1 trunk interconnections over a high bandwidth packet-switched data network. The system 400 includes a plurality of existing T1 (or E1) telecommunications signal switches 410, like those 101, 200 described with reference to FIGS. 1 and 2. Each switch 410 accepts a plurality of incoming telecommunications signal sources 401, like those 201 described with respect to FIG. 2. In one embodiment, each switch 410 is directly paired with a T1(or E1)-to-IP multiplexer 420. T1 (or E1) trunk signals are provided to each multiplexer 420 via T1 (or E1) links 411. Each T1 (or E1) link 411 shown in the system 400 represents what would otherwise be a requirement for a T1 or E1 trunk between the switches 410. For example, T1 (or E1) link A to B 411 represents T1 (or E1) frames output from switch A 410 and destined for switch B 410. Similarly, T1 (or E1) link A to N 411 represents T1 (or E1) frames output from switch A 410 and destined for switch N 410. IP network packets carrying T1 (or E1) frame information are output from each of the T1(E1)-to-IP multiplexers 420 on buses 421 in a format compatible with a high speed packet-switched data network 440. In one embodiment, full-duplex 100 Base TX Ethernet switches 430 provide switching of the T1 (or E1) network packets over the high bandwidth data network 440. The switches 430 access the high bandwidth network 440 via buses 431. In an alternative embodiment, full-duplex IP routers provide routing of the IP packets over the high bandwidth network 440. One skilled in the art will appreciate that an Ethernet switch 430 transmits the packets more efficiently than a router because the switch 430 does not access to the IP header information within the packets. To guarantee quality of service and timely transmission of network packets, the high bandwidth data network 440 should operate at a speed of at least 100 Mbps. One skilled in the art will also appreciate that traffic over the network, i.e., the number of frames transmitted within a single packet, should not be greater than that which the network 440 can deliver in a timely fashion. A typical 100 Mbps network 440 can support timely transmission frame data corresponding to 20 T1 (or E1) trunks.

Operationally, a multiplexer 420 according to the present invention may accept a plurality of T1 (or E1) frame sources 411 from an existing T1 (or E1) central office switch 410. In one embodiment, a multiplexer 420 provides four T1 (or E1) ports to accept four different T1 (or E1) frame sources 411. In an alternative embodiment, the multiplexer 420 provides a variable number of T1 (or E1) ports up to a maximum of 20 ports. The multiplexer 420 receives the T1 (or E1) frame streams from each T1 (or E1) frame source 411 in real time and converts these streams to packets for transmission over the IP network 440 by completely encapsulating each T1 frame within a network packet using IP protocol. In the embodiment shown in FIG. 4, Ethernet is used for the physical layer protocol, however, one skilled in the art will appreciate that any of the high-bandwidth network protocols can be used for routing of network packets to include FDDI, X.25, and ATM.

Packets corresponding to a particular T1 (or E1) frame stream 411 are queued over a 250-microsecond interval and then transmitted to a destination multiplexer 420 over the packet-switched network 440. The destination multiplexer 420 strips away all network-related information and converts the T1 (E1) network packets back into signals compatible with a destination T1 (or E1) switch 410. The destination T1 (or E1) switch 410 receives the converted T1 (or E1) stream and routes each channel in the stream to its destination signal line 401, completely oblivious to the medium of transmission that has been used to route the stream. Instead of implementing a costly T1/E1 trunk network to interconnect, say, switch A 410 and switch B 410, the multiplexers 420 according to the present invention allow true connectivity of the switches 410 over the high-bandwidth network 440. And, as was alluded to above, most providers today are beginning to provide gateways 430, 431 to the network 440. Now referring to FIG. 5, a block diagram is presented illustrating details of a T1(E1)-to-IP multiplexer 500 according to the present invention. In one embodiment, the T1(E1)-to-IP multiplexer 500 includes four T1(E1) trunk interface logic ports 510. In an alternative embodiment, up to 20 T1(E1) ports 510 are provided. Each T1(E1) port 510 provides full-duplex connectivity with a corresponding synchronous T1 frame stream 501 associated with a T1(E1) switch (not shown). Each port 510 transmits and receives T1(E1) data to network translation logic 520 via buses 511. In one embodiment, the network translation logic 520 comprises a PowerPCO processor card with 32 MB of random access memory (RAM). The network translation logic 520 provides formatted network packets to network interface logic 530 via bus 521. The network interface logic 530 transmits/receives packets from a router (not shown) connected to a packet-switched network (not shown) via a gateway 531. One embodiment of an E1-to-IP multiplexer 500 is described in Appendix A, which is attached hereto.

In operation, T1/E1 frames are received from the T1/E1 sources 501 and are queued for a 250-microsecond interval within the network translation logic 520. Since a T1/E1 carrier signal is a continuous and synchronous signal, the multiplexer 500 according to the present invention derives its transmit clock from the T1 signal 501 provided to each port. Thus, packet transmission corresponding to a port 510 over the network is synchronized with the data being received from that port 510. Since multiple ports 510 can receive T1 frames destined for the same switch (i.e., representing parallel trunks interconnecting two T1 switches), in one embodiment the multiplexer 500 according to the present invention provides the capability to transmit packets for multiple ports associated with the same destination switch in a single network transmission up to a maximum of 1500 bytes per packet.

Figure 6:
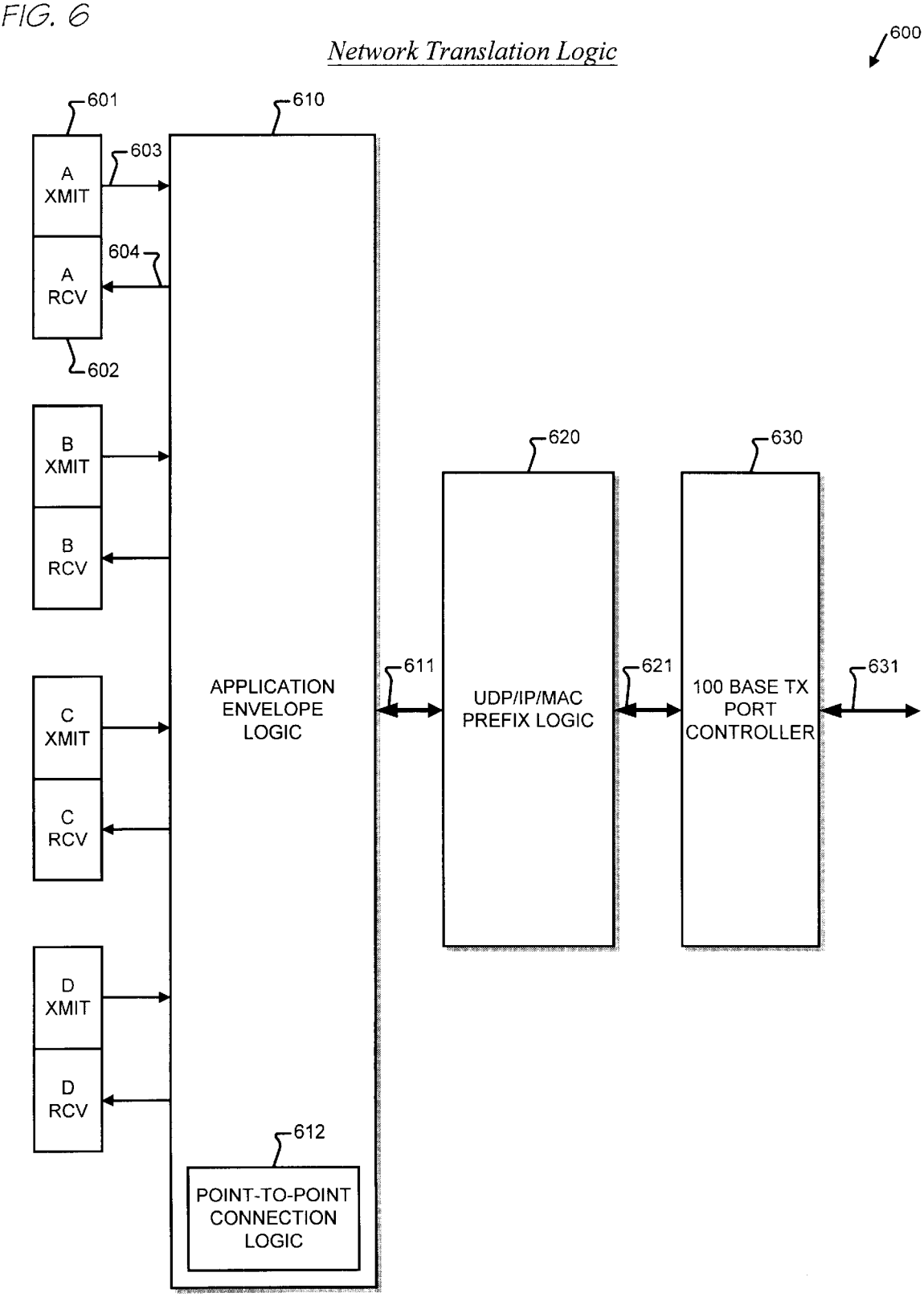
FIG. 6 is a block diagram providing details of network translation logic within a T1(E1)-to-IP multiplexer.

Now referring to FIG. 6, a block diagram is presented providing details of network translation logic 600 within one embodiment of a T1(E1)-to-IP multiplexer according to the present invention. The network translation logic includes four sets of transmit queue logic 601 and receive queue logic 602, each of the sets 601, 602 corresponding to a specific frame stream. In one embodiment the stream is formatted in accordance with T1 carrier protocol. In an alternative embodiment, the stream is formatted in accordance with E1 carrier protocol. Hereinafter, discussion will proceed in terms of a E1 embodiment, however, one skilled in the art will appreciate that such discussion is equally applicable to a T1 carrier system.

E1 transmit frame data is output from the transmit queue logic 601 via bus 603 to application envelope logic 610 and E1 receive frame data is provided by the application envelope logic 610 to the receive queue logic 602 via bus 604. The application envelope logic 610 also includes point-to-point connection logic 612 for maintaining port address mappings to destination multiplexers. The application envelope logic 610 interfaces to UDP/IP/MAC prefix logic 620 via bus 611. Formatted network packets are provided to/from a 100 Base TX port controller 630 via bus 621. The port controller 630 interfaces to a network router (not shown) via gateway bus 631.

Operationally, to provide proper frame queuing, transmission clocks are derived from each E1 transmit stream input into a transmit queue 601. E1 channel transmit data is queued for a period of 250 microseconds (i.e., two complete frames) and then dumped to the application envelope logic 610. The point-to-point connection logic 612 provides trunk routing information corresponding to each E1 transmit stream. The trunk routing information is included in an application header that is appended to the two frames of E1 data (i.e., 64 bytes), thus forming an application packet. Multiple application packets that are destined for the same destination switch are grouped together by the application envelope logic 510 into the data portion of a UDP datagram and are thus provided to the UDP/IP/MAC prefix logic 620 over bus 611. The UDP/IP/MAC logic 620 appends a UDP header, IP header, MAC header, and Ethernet preamble to the grouped application packets to form an Ethernet packet. The UDP header is appended to allow debugging to occur under a Unix environment; UDP formatting is not otherwise required. Formatted Ethernet packets are passed to the port controller 630 via bus 621 for transmission over the high bandwidth Ethernet network. The port controller 630 routes the packet traffic to the network via bus 631 in accordance with Ethernet protocol.

Packets are received from the network via bus 631 and are provided by the port controller 630 to the prefix logic 620. The prefix logic 620 strips away preamble and MAC, IP, and UDP header information from the received packets and provides a group of received application packets to the envelope logic 610 via bus 611. The point-to-point connection logic 612 maps application header routing information within received E1 application packets to a corresponding receive queue 602 and the application envelope logic 610 in turn strips away the application headers from the application packets to reveal the data associated with two 32-channel E1 frames destined for a specific port. The data is then passed to the proper receive queue 602 via bus 604. The receive queue logic 604 is continuously generating an outgoing E1 frame stream and thus inserts the queued data into the outgoing stream. During those times when latency on the packet-switched network results in an empty receive queue 602, a condition known as a frame slip, the receive queue logic 602 generates a fill frame in accordance with T1 protocol. The present invention achieves latencies less than three milliseconds, end-to-end.

In addition to the formatting of packets for transmission and stripping of packet-switched header information from received packets, the application envelope logic 610 monitors transmission and reception activity of packets at the application level. The envelope logic 610 also generates error messages and establishes and terminates connections between switches.

Figure 7:
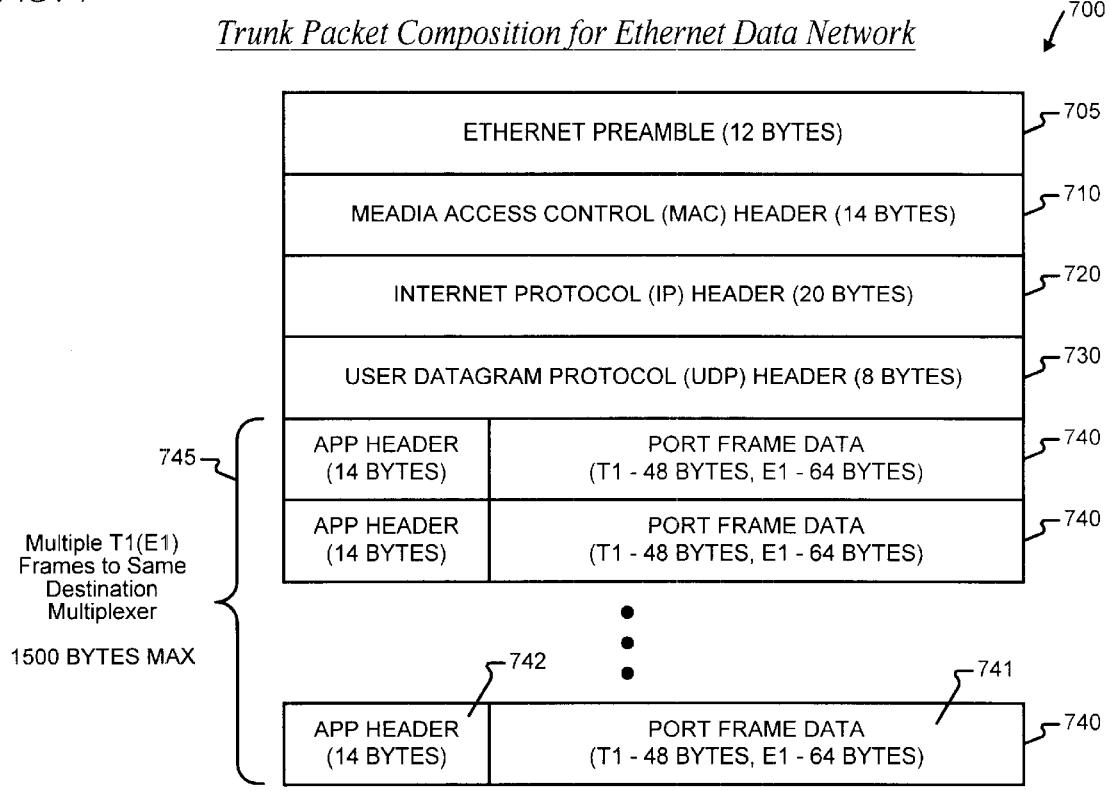
FIG. 7 is a diagram illustrating the composition of a T1 trunk packet according to the present invention for transmission over a high speed Ethernet network.

Now referring to FIG. 7, a diagram is presented illustrating the composition of an E1 trunk packet 700 according to the present invention for transmission over a high speed Ethernet network. The E1 trunk packet 700 consists of a number of application packets 740, all of which are destined for the same destination multiplexer according to the present invention. As was alluded to above, each application packet 740 has a data field 741 and an application header 742. The data field 741, in an E1 embodiment, contains 64 bytes (i.e., two consecutive frames) of digitized telecommunications data, each byte corresponding to a channel within an E1 frame. In a T1 embodiment, the data field 741 contains 48 bytes of telecommunications data (i.e., two consecutive T1 frames), each byte corresponding to a channel within a frame. In one embodiment, the size of each application header 742 is 14 bytes. Envelope logic according to the present invention groups application packets 740 together into the data portion 745 of a UDP datagram. Prefix logic in turn appends an 8-byte UDP header 730, a 20-byte IP header 720, a 14-byte MAC header 710, and a 12-byte Ethernet preamble 705 to the grouped application packets 745. Thus, a network packet 700 is formatted for transmission over a high speed packet-switched network to a destination switch having a multiplexer according to the present invention.

Figure 8:
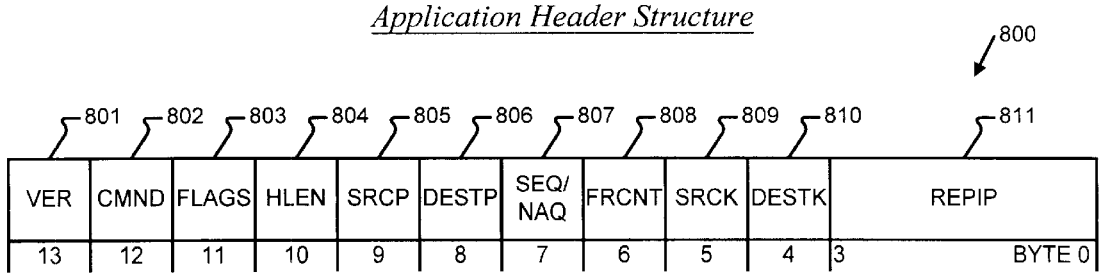
FIG. 8 is a diagram depicting the structure of an application header for a T1 frame packet according to the present invention.

Now referring to FIG. 8, a diagram is presented depicting the structure of an application header 800 according to one embodiment of the present invention. The application header 800 is appended to each set of T1(E1) data corresponding to two consecutive T1(E1) frames. The application header 800 has a version (VER) field 801, a command (CMND) field 802, a flags (FLAGS) field 803, a header length (HLEN) field 804, a source port number (SRCP) field 805, a destination port number (DESTP) field 806, a sequencing/not acknowledge (SEQ/NAQ) field 807, a frame count (FRCNT) field 808, a source session key (SRCK) field 809, a destination session key (DESTK) field 810, and a 4-byte reply IP address (REPIP) field 811.

VER 801 contains a version number for application software within a multiplexer according to the present invention to ensure interoperability of multiple fielded versions of the system.

CMND 802 indicates to a partner multiplexer whether the corresponding frames contains data, or whether the frames should be ignored, or whether the frames indicate an error code.

FLAGS 803 indicates whether its corresponding frames are the last frames in a grouped set of frames.

HLEN 804, indicates the number of bytes in the application header. In one embodiment, this field 804 indicates 14 bytes. SRCP 805 contains the T1(E1) port number in the transmitting multiplexer. DESTP 806 indicates the port number which is to receive the data in the corresponding frames.

SEQ/NAQ 807 indicates a sequence number for normally transmitted frames and is used by a receiving multiplexer to detect out-of-sequence frames. When CMND 802 indicates an error condition, this field 807 contains an error code. In one embodiment, error codes include 1) destination port not available, 2) destination port busy, 3) destination port down, 4) invalid version number, 5) invalid CMND field 802 in a received header 800, 6) invalid HLEN field 804 in a received header 800, 7) all other undefined error conditions, 8) no framing on a T1(E1) port, 9) post frame as data in a log file for system maintenance.

FRCNT 808 indicates the number of frames in a transmitting port's frame buffer. SRCK 809 contains a session key from a receiving switch and DESTK 810 contains a session key from the transmitting switch.

REPIP 811 is used by a multiplexer that has multiple IP addresses to indicate which IP address it wants to receive reply data on. This enables a multiplexer according to the present invention to balance transmit and receive processing loads.

As the examples of FIGS. 4 through 8 illustrate, the system according to the present invention enables a telephone service provider to utilize a gateway to a high speed packet-switched network for the purpose of providing additional T1(E1) trunks between telecommunications switches. The provider is not bound to increase an existing and already substantial investment in older technology networks while the market rapidly moves toward packet-switched communication networks. Providers can now exhaust their investment in older T1/E1 networking equipment while at the same time taking advantage of benefits of high-bandwidth data networks.

Figure 9:
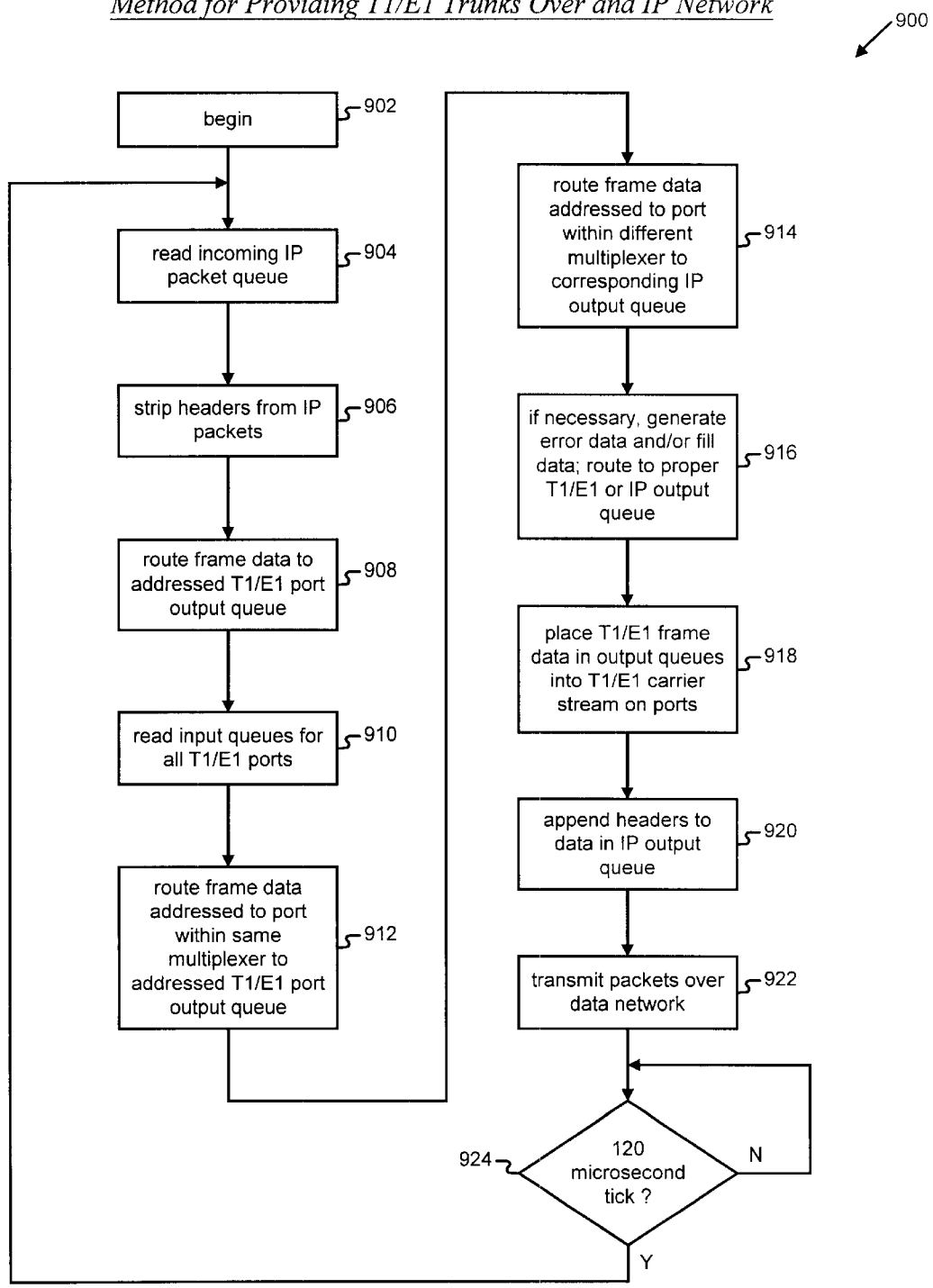
FIG. 9 is a flow chart illustrating a method according to the present invention for transmitting T1 trunk data over a high speed data network.

Now referring to FIG. 9, a flow chart 900 is presented illustrating a method according to the present invention for transmitting T1/E1 trunk data over a high speed data network.

Flow begins at block 902 where a T1/E1-to-IP multiplexer according to the present invention begins manage T1/E1 traffic between T1/E1 telecommunications switches. Flow then proceeds to block 904.

At block 904, an incoming IP packet queue according to the present invention is read. Recently received IP packets are retrieved from the queue. Flow then proceeds to block 906.

At block 906, packet-switched network header information is stripped from the received packets to reveal a number of T1/E1 application packets. Each application packet comprises an application header according to the present invention and an application data field. The application data field consists of data corresponding to two consecutive T1/E1 frames. Flow then proceeds to block 908.

At block 908, the application headers are evaluated and each of the application data fields are written to T1/E1 port output queues as directed by their corresponding application header. At this point T1/E1 frame data is has been received in packet form over the effected T1/E1 trunk and has been queued for delivery over T1/E1 ports within the multiplexer. Flow then proceeds to block 910.

At block 910, frame data from T1/E1 port input queues within the multiplexer is retrieved. Flow then proceeds to block 912.

At block 912, the retrieved frame data is evaluated. Frame data that is targeted for delivery to a particular T1/E1 port that is within the multiplexer is placed in the particular T1/E1 port's output queue. Flow then proceeds to block 914.

At block 914, frame data that is targeted for delivery to T1/E1 ports within a different multiplexer according to the present invention are placed in an IP output queue that corresponds to the IP address of the different multiplexer. Flow then proceeds to block 916.

At block 916, all T1/E1 port output queues and IP output queues are evaluated to determine if it is required to provide fill data or error codes. Fill data and/or error code data is placed in the output queues as required. Flow then proceeds to block 918.

At block 918, T1/E1 output logic according to the present invention reads the T1/E1 frame data from each T1/E1 port output queue and inserts the T1/E1 frame data into a continuously generated T1/E1 carrier signal on each T1/E1 port. Flow then proceeds to block 920.

At block 920, network headers are appended to data in each IP output queue resulting in a number of IP packets. Flow then proceeds to block 922.

At block 922, each of the IP packets are transmitted over a high bandwidth packet-switched network according to the present invention. Flow then proceeds to decision block 924.

At decision block 924, an evaluation is made to determine if a 120 microsecond interval has expired. If not, then flow proceeds to this same decision block 924. If so, then flow proceeds to block 904.

The method continues to perform the steps discussed with reference to blocks 904 through 924 every 120 microseconds.

Although the present invention and its objects, features, and advantages have been described in detail, other embodiments are encompassed by the invention. For example, the present invention has been discussed in particular with reference to T1 and E1 telecommunications frame signals, however other, faster telecommunications protocols exist such as T2, T3, E2, E3, E4, etc., each of which employs T1(E1) as a basis waveform. In addition, other telecommunication protocols have been developed for wireless or RF networks, that work at speeds from 9 Mhz up. The present invention certainly comprehends such protocols to the extent that high bandwidth data networks can supply the bit rates necessary to ensure timely transmission of frame data an to provide overall quality of service.

In addition, the present invention has been described particularly in terms of voice signals originating from a telephone for these are the most common signals presented to a T1(E1) switch for transmission. However, the present invention comprehends any type of signal or modulation that can be transmitted over a T1 carrier for the content of the signal itself is completely transparent to the apparatus and method according to the present invention.

Furthermore, conventional central office switches used by commercial telephone service providers are exemplified in this application for this area of the field experiences the most consistent and pressing need for trunk expansion. But one skilled in the art will appreciate the applicability of the present invention to any type of T1(E1) switching equipment, including equipment used by private telecommunications link providers and Internet service providers (ISPs).

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A multiplexer, for transmitting and receiving central office switch communications between a first central office switch and a second central office switch, the multiplexer utilizing a high bandwidth data network to replace a trunk that would otherwise be required to link the first and second central office switches, the multiplexer comprising:

trunk interface logic, coupled to the first central office switch via a central office switch trunk, for receiving and transmitting the central office switch communications from and to the first central office switch; and network translation logic, coupled to said trunk interface logic, for translating the central office switch communications to and from data network communications, so that the central office switch communications may be transferred over the high bandwidth data network to and from the second central office switch, thereby providing all channels of said central office switch trunk between the first and second central office switches.

2. The multiplexer as recited in claim 1, wherein the central office switch communications comprise a T1 link.

3. The multiplexer as recited in claim 2, wherein said T1 link comprises a plurality of T1 frames provided to the multiplexer at a rate of 1.544 Mbps, and wherein each of said plurality of T1 frames comprises 24 channels.

4. The multiplexer as recited in claim 1, wherein the central office switch communications comprise an E1 link.

5. The multiplexer as recited in claim 4, wherein said E1 carrier signal comprises a plurality of E1 frames provided to the multiplexer at a rate of 2.048 Mbps, and wherein each of said plurality of E1 frames comprises 32 channels.

6. The multiplexer as recited in claim 1, wherein said network translation logic queues frames of the central office switch communications provided by the first central office switch to form queued frame data, and wherein said network translation logic appends header information to said queued frame data to form a packet of the data network communications.

7. The multiplexer as recited in claim 6, wherein said packet of the data network communications is transmitted over the high bandwidth network to a destination multiplexer that is coupled to the second central office switch.

8. The multiplexer as recited in claim 7, wherein said header information contains an address for said destination multiplexer and wherein routing apparatus on the high bandwidth data network utilize said address to route said packet of the data network communications to said destination multiplexer.

9. An apparatus for transmitting telecommunications frames between telecommunications switches via a high bandwidth data network instead of over a telecommunication trunk, the apparatus comprising:
   a plurality of telecommunications interface ports, each configured to transmit and receive frames associated with a corresponding telecommunications trunk, said corresponding telecommunications trunk interconnecting two of the telecommunications switches;
   network translation logic, coupled to said plurality of telecommunications interface ports, configured to translate outgoing frames into outgoing data packets for transmission over the high bandwidth data network, and configured to translate incoming data packets into incoming frames for distribution to said plurality of telecommunications interface ports; and
   a network interface port, coupled to said network translation logic, configured to provide full-duplex routing of said outgoing data packets and said incoming data packets over the high bandwidth data network, wherein said full-duplex routing enables all channels of said corresponding telecommunications trunk to interoperate between the telecommunications switches.

10. The apparatus as recited in claim 9, wherein the telecommunication frames are T1 carrier frames and the telecommunications switches are T1 telecommunications switches.

11. The apparatus as recited in claim 10, wherein each of said T1 carrier frames comprises 24 channels of digitized telecommunications data, said 24 channels being time-division multiplexed into a 1.544 Mbps digital stream; and wherein each of said 24 channels represents a distinct telecommunications connection; and wherein said each of said T1 carrier frames are transmitted at a rate of 8,000 frames per second.

12. The apparatus as recited in claim 9, wherein the telecommunication frames are E1 carrier frames and the telecommunications switches are E1 telecommunications switches.

13. The apparatus as recited in claim 12, wherein each of said E1 carrier frames comprises 32 channels of digitized telecommunications data, said 32 channels being time-division multiplexed into a 2.048 Mbps digital stream; and wherein each of said 32 channels represents a distinct telecommunications connection; and wherein said each of said E1 carrier frames are transmitted at a rate of 8,000 frames per second.

14. The apparatus as recited in claim 9, wherein the high bandwidth data network comprises a packet-switched data network.

15. The apparatus as recited in claim 14, wherein said packet-switched data network operates at a speed of 100 Mbps.

16. The apparatus as recited in claim 15, wherein said each of said plurality of telecommunications interface ports queues said incoming frames for a period of 250 microseconds.

17. The apparatus as recited in claim 16, wherein each of said incoming frames comprises a plurality of data bytes, each of said plurality of data bytes being associated with a corresponding channel within said incoming frames.

18. The apparatus as recited in claim 17, wherein said network translation logic encapsulates said each of said incoming frames into an application packet, wherein said application packet comprises:
   an application header, said application header providing information to enable timely transmission of a corresponding incoming frame to a destination; and
   frame data, coupled to said application header, said frame data providing said plurality of data bytes.

19. The apparatus as recited in claim 18, wherein said network translation logic incorporates all of said application packets that are queued during a 250 microsecond interval into an Internet Protocol (IP) packet.

20. The apparatus as recited in claim 19, wherein said network translation logic encapsulates said IP packet into a high bandwidth network packet, said high bandwidth network packet providing a physical address of a destination switch for said incoming telecommunications frames.

21. The apparatus as recited in claim 20, wherein said packet-switched data network comprises an Ethernet data network and said physical address is provided in a media access control (MAC) header within said high bandwidth network packet.

22. The apparatus as recited in claim 18, wherein said network interface port controls data packet routing for all of said plurality of telecommunications interface ports over the high bandwidth data network.

23. The apparatus as recited in claim 22, wherein said network interface port controls data packet routing for four telecommunications interface ports over the high bandwidth data network.

24. A telecommunications carrier multiplexer, for providing trunk signals between telecommunications switches, the trunk signals being transmitted over a packet-switched data network, the telecommunications carrier multiplexer comprising:
   trunk interface logic, for transmitting and receiving trunk frames corresponding to a particular telecommunications trunk, said particular trunk interconnecting a first telecommunications switch and a second telecommunications switch;
   network translation logic, coupled to said trunk interface logic, for translating said trunk frames associated with said first and second telecommunications switches into network packets for transmission over the high bandwidth data network, said network translation logic comprising:
      application envelope logic, for appending a corresponding application header to each of said trunk frames to form a plurality of application packets, wherein said corresponding application header provides control data that enables transmission of a corresponding trunk frame; and
   network interface logic, coupled to said network translation logic, for providing full-duplex routing of said network packets over the data network, each of said network packets comprising:
      an application packet set, comprising those of said application packets that are generated during a 250-microsecond interval; and an IP header, appended to said application packet set to form an IP datagram, providing IP network routing information for said application packet set.

25. The telecommunications carrier multiplexer as recited in claim 24, wherein said trunk frames comprise T1 frames.

26. The telecommunications carrier multiplexer as recited in claim 24, wherein said trunk frames comprise E1 frames.

27. The telecommunications carrier multiplexer as recited in claim 24, wherein the packet-switched data network operates at a speed of at least 100 Mbps.

28. The telecommunications carrier multiplexer as recited in claim 27, wherein each of said trunk frames comprises a plurality of data bytes, each of said plurality of data bytes being associated with a corresponding channel.

29. The telecommunications carrier multiplexer as recited in claim 28, wherein said network translation logic encapsulates said IP datagram into one of said network packets, said one of said network packets providing a physical address of a destination switch for said trunk frames.

30. The telecommunications carrier multiplexer as recited in claim 29, wherein the packet-switched data network comprises an Ethernet data network and said physical address is provided in a media access control (MAC) header within said one of said network packets.

31. A telecommunications switch interconnection apparatus, comprising:
- a trunk frame multiplexer, configured to receive trunk frames from a source central office switch, and configured to translate said trunk frames into network packets;
- a data network router, coupled to said trunk frame multiplexer, configured to transmit said network packets over a high speed data network, wherein said network packets are transmitted in such a manner as to effect transmission of said trunk frames from said source central office switch to a destination central office switch.

32. The telecommunications switch interconnection apparatus as recited in claim 31, wherein said trunk frames comprise T1 frames.

33. The telecommunications switch interconnection apparatus as recited in claim 31, wherein said trunk frames comprise E1 frames.

34. The telecommunications switch interconnection apparatus as recited in claim 31, wherein said high speed data network comprises a packet-switched data network that operates at a speed of at least 100 Mbps.

35. The telecommunications switch interconnection apparatus as recited in claim 34, wherein each of said trunk frames comprises a plurality of data bytes, each of said plurality of data bytes being associated with a corresponding channel.

36. The telecommunications switch interconnection apparatus as recited in claim 35, wherein said trunk frame multiplexer encapsulates said each of said trunk frames into an application packet that provides information to enable transmission to said destination central office switch, and wherein said trunk frame multiplexer formats a plurality of said application packets into one of said network packets for transmission over said high speed data network.

37. The telecommunications switch interconnection apparatus as recited in claim 36, wherein said plurality of said application packets comprises the number of said application packets that are received for transmission within a 250-microsecond interval.

38. The telecommunications switch interconnection apparatus as recited in claim 37, wherein said trunk frame multiplexer appends IP and network protocol headers to said plurality of said application packets to form said one of said network packets.

39. The telecommunications switch interconnection apparatus as recited in claim 38, wherein said one of said network packets provides a destination address for a destination trunk frame multiplexer to receive said trunk frames.

40. The telecommunications switch interconnection apparatus as recited in claim 39, wherein said packet-switched data network comprises an Ethernet data network and said destination address is provided in a media access control (MAC) header within said one of said network packets.

* * * * *